US009030562B2

(12) United States Patent
Petricoin, Jr.

(10) Patent No.: US 9,030,562 B2
(45) Date of Patent: May 12, 2015

(54) USE OF A TWO- OR THREE-DIMENSIONAL BARCODE AS A DIAGNOSTIC DEVICE AND A SECURITY DEVICE

(75) Inventor: Dennis M. Petricoin, Jr., Hemlock, NY (US)

(73) Assignee: Robert Bosch GmbH, Stuttgart (DE)

( * ) Notice: Subject to any disclaimer, the term of this patent is extended or adjusted under 35 U.S.C. 154(b) by 508 days.

(21) Appl. No.: 13/310,685

(22) Filed: Dec. 2, 2011

(65) Prior Publication Data

US 2013/0141587 A1 Jun. 6, 2013

(51) Int. Cl.

*H04N 7/18* (2006.01)
*G06K 5/00* (2006.01)
*G07C 9/00* (2006.01)

(52) U.S. Cl.

CPC .................................. *G07C 9/00111* (2013.01)

(58) Field of Classification Search

CPC ..... G07C 9/00111; G06F 21/35; G06F 21/44; G06Q 20/3224; G06G 2221/2111
USPC .......................................................... 348/156
See application file for complete search history.

(56) References Cited

U.S. PATENT DOCUMENTS

| | | | | |
|---|---|---|---|---|
| 3,694,810 A * | 9/1972 | Mullens et al. | 340/5.33 |
| 5,947,369 A * | 9/1999 | Frommer et al. | 235/382 |
| 2002/0095487 A1* | 7/2002 | Day et al. | 709/223 |
| 2004/0217173 A1* | 11/2004 | Lizotte et al. | 235/462.01 |
| 2005/0289061 A1* | 12/2005 | Kulakowski et al. | 705/50 |
| 2007/0017349 A1 | 1/2007 | Uehara | |
| 2007/0115358 A1 | 5/2007 | McCormack | |
| 2007/0133843 A1 | 6/2007 | Nakatani | |
| 2008/0047009 A1 | 2/2008 | Overcash et al. | |
| 2009/0012634 A1 | 1/2009 | Koch | |
| 2009/0079823 A1 | 3/2009 | Bellamy et al. | |
| 2010/0046553 A1* | 2/2010 | Daigle et al. | 370/474 |
| 2012/0268274 A1* | 10/2012 | Wieser | 340/545.2 |

* cited by examiner

*Primary Examiner* — Hee-Yong Kim
(74) *Attorney, Agent, or Firm* — Michael Best & Friedrich LLP

(57) ABSTRACT

A building security system includes means for detecting human motion. An imaging device scans for a visible code in response to the detection of human motion by the detecting means. A security device deciphers the scanned code, determines an authorization level associated with the deciphered code, and provides the human with a level of access to the building commensurate with the authorization level.

18 Claims, 4 Drawing Sheets

USE OF A TWO- OR THREE-DIMENSIONAL BARCODE AS A DIAGNOSTIC DEVICE AND A SECURITY DEVICE

BACKGROUND

1. Field of the Invention

The patent relates to the field of surveillance systems and more particularly to surveillance systems having a user interface.

2. Description of the Related Art

In the field of surveillance and security systems, it may be difficult for a security system to communicate its status, problems, or failure modes to a user or repair personnel. The communication may call for some means of interface between the security system and the user or repair personnel. The interface may be wireless or cable-based, for example. However, such wireless or cable-based interfaces have high costs.

Currently getting diagnostic or status information from a security device requires special hardware and software to collect and parse the information. At the same time, it has become increasingly common for people to have devices such as cell phones/smartphones which have both high resolution cameras and live internet connections.

What is neither disclosed nor suggested by the prior art is a surveillance security system providing a simple method to convey diagnostic or status information from an electronic device such as a user interface to a person via a visual indicator such as a two- or three-dimensional code or a QR code. It is known to use QR codes for product or person identification or information at stores and other retail locations. A user may take a picture of the QR code using his cell phone and then be provided with an interpretation of the code from an app loaded on the cell phone.

A basic function of a security system is that it must be able to identify people who are allowed to be in a secure area, or allowed to interact with the security system, and people who are not allowed. An approved user may be verified by something he knows (e.g., a passcode), something he has in his possession (e.g., a token or RFID card), or by some physical characteristic of the user (e.g., a biometric characteristic, such as a fingerprint). A combination of two or all three of a user's knowledge, possession, or physical characteristic may be required in order to increase the level of security of the system.

Problems with security systems include their difficulty of use, difficulty of user management, and difficulty of personal identification number (PIN) or passcode management.

SUMMARY

The invention may be directed to an electronic device, such as a user interface of a security system, that may generate and display a code that may be read by a camera or other scanning apparatus in order to convey diagnostic or status information. Thus, the invention may provide added and up-to-date information in the form of a visual indicator without the need for special connections to the device or highly specific and expensive-to-develop software applications.

In a more specific embodiment, the invention may be directed to an electronic device that displays a 2D/3D/QR code indicative of the device's status. A scanning device such as a camera equipped cell phone captures an image of the displayed code and determines its meaning, either internally or by referring to some Internet-based source, and then conveys the meaning to the user.

In one embodiment, the electronic device that displays a 2D/3D/QR code is a user interface or control panel of a building security system. More particularly, a surveillance system may display its status as a QR code. The QR code may be read by a cell phone camera that uses an Internet-based source to interpret the QR code for display to a user.

In another embodiment, the invention is directed to a security system in which a person presents a QR code to a camera in order to gain access to the secured area. The QR code may be displayed on the person's badge or cell phone. The system may expect a certain QR code to match a previously user-entered pin number. When a user enters a code or approaches the security system and is detected by a motion detector, the system begins scanning for the displayed QR code.

More particularly, a surveillance system may detect human motion in front of a user interface or control panel. In response to sensing the human motion, the surveillance system may scan the area of the human motion for a QR code displayed by the person on a cell phone or a badge. Because a QR code is two-dimensional, the scanning may be in both of two perpendicular directions, such as horizontal and vertical.

Although the invention may be described herein as applying to a security system and the security market in general, it is to be understood that the invention may also be applied to other markets and products. The invention may be applicable to any device that is capable of displaying or reading a two- or three-dimensional barcode.

In another embodiment, the invention takes advantage of the capability of a smartphone or badge, etc., that is carried by a user to display a particular pattern such as a two- or three-dimensional barcode or QR code. A scanning device, such as a camera, on the security system may scan the displayed code. Thus, displaying the code to a sensor on the security system may enable the security system to identify the person carrying the displayed code and grant that person some level of authority. Accordingly, the invention may provide the system with a high level of security and/or make the system easier to use.

A user's cell phone or smartphone may display a QR code to a camera that is attached to the security system. The security system may then use the code to identify the particular person who carries the phone.

The security system can sense the presence of the phone via Bluetooth-based communication with the phone, or via some other communication method. Alternatively, a motion detector of the security system may sense the presence of the user in front of the user interface or the control panel of the security system. After sensing the user's presence, the camera of the security system may begin to scan for the code displayed by the user's phone, which the user may hold up to the camera. The system may allow the user access to the system or to the premises only if the user's phone displays a certain QR code, or a certain type of QR code. In one embodiment, the security system expects a certain QR code, or a certain type of QR code, to be displayed based on a pin number previously entered by the user at the system keypad or on the phone.

In one embodiment, a temporary QR code can be sent from a remote location to the phone of an employee, service technician or other user to provide the user with only limited access to the system or the protected premises. Such a temporary QR code may be preloaded into the security system, or may be transmitted from the remote location to the security system at the same time that the temporary QR code is transmitted to the user's phone.

In another embodiment, the scanning of an approved QR code may trigger or initiate a particular response in the security system. For example, upon scanning and recognizing an approved QR code that is known by the system to be given to a system repairman or technician, the security system may enter a diagnostic mode or display or transmit a special report regarding the status of the system that the technician may use in servicing the system In yet another embodiment, a QR code on a user's badge can be read by a camera on the security system, and, in response, the system can speed up a biometric analysis by doing a one to one search. That is, the system may identify the user by the QR code on his badge. The system may then immediately subsequently measure the user's biometric characteristic and compare that measured biometric characteristic to that particular user's stored biometric characteristic. That is, by virtue of knowing which user is represented by the QR code, the system does not need to compare the presently measured biometric characteristic to the stored biometric characteristic of each authorized user of the system. This embodiment may provide a more robust biometric system as the data to be analyzed can be more detailed.

In one aspect, the invention includes a building security system including means for detecting human motion. An imaging device scans for a visible code in response to the detection of human motion by the detecting means. A security device deciphers the scanned code, determines an authorization level associated with the deciphered code, and provides the human with a level of access to the building commensurate with the authorization level.

In another aspect, the invention includes a method of operating a building security system, including detecting human motion near an imaging device of the security system. In response to the detecting step, an imaging device is used to scan for a visible code displayed in front of the imaging device. The scanned code is deciphered, and an authorization level associated with the deciphered code is determined. The human is provided with a level of access to the building commensurate with the authorization level.

In still another aspect, the invention includes a building security system including a motion detector. An imaging device scans a two-dimensional visible code in each of two different directions in response to the detection of motion by the motion detector. A security device deciphers the scanned code, and determines an authorization level associated with the deciphered code. A human is provided with a level of access to the building. The level of access is dependent upon the authorization level.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
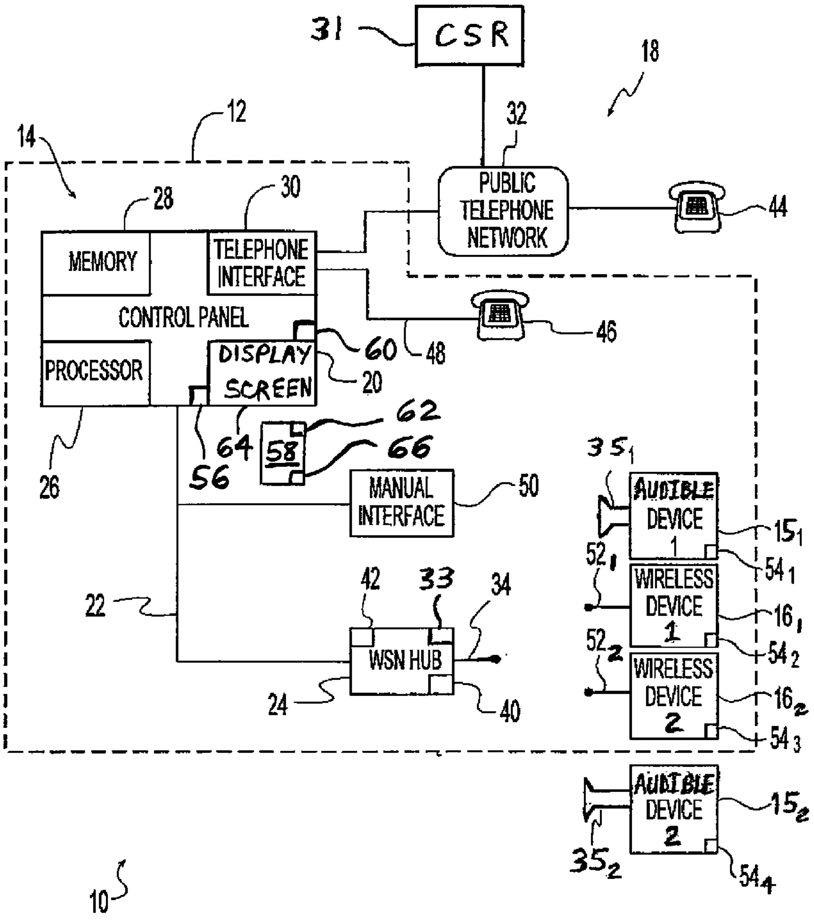
FIG. 1 is a block diagram of one embodiment of a building security arrangement of the invention.

Corresponding reference characters indicate corresponding parts throughout the several views. Although the drawings represent embodiments of the invention, the drawings are not necessarily to scale and certain features may be exaggerated in order to better illustrate and explain the invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Referring now to the drawings, and particularly to FIG. 1, there is shown one embodiment of a security system 10 of the invention for a structure 12 such as a building. However, system 10 may be used to secure other spaces, such as outdoor areas, subterranean rooms and passages, and zones of air space. System 10 includes a system controller 14, audible security devices $\mathbf{15}_1$, $\mathbf{15}_2$, non-audible wireless security devices $\mathbf{16}_1$, $\mathbf{16}_2$, and an installer interface 18. Audible security devices $\mathbf{15}_1$, $\mathbf{15}_2$ may be stand alone off-the-shelf security devices which may be designed by their manufacturer to be operable independently of the remainder of security system 10.

System controller 14 includes a control device in the form of a control panel 20 electrically connected via an option bus 22 to a wireless sensor network (WSN) hub 24, which also may be referred to as a "wLSN hub". Control panel 20 may include a processor 26, a memory device 28, a telephone/computer interface 30, and a manual interface 50.

Processor 26 may coordinate communication with the various system components including installer interface 18 and WSN hub 24. Memory 28 may include software for interpreting signals from audible devices 15, wireless devices 16 and installer interface 18, and deciding based thereon whether to transmit an alarm signal from control panel 20. Memory 28 may also serve as a database for audible devices 15 and wireless devices 16. The alarm signal may be used to activate an audible alarm (not shown) within building 12, or to notify a central monitoring station or "central station receiver" (CSR) 31 such as a security company, fire station, or police station, for example, via public switched telephone network 32. Network 32 may otherwise be known as the network of the world's circuit-switched telephone networks. Memory 28 may also store identification information and configuration data for audible devices 15 and/or wireless devices 16, as described in more detail below.

In one embodiment, CSR 31 may remotely control system 10 through network 32. For example, CSR 31 may remotely arm or disarm system 10, and arm, disarm, configure or re-configure individual sensors.

WSN hub 24 may include a sound detector which may be in the form of a microphone 33 for receiving air-borne audible signals, such as audible alarm signals. The audible alarm signals may be transmitted from speakers or sirens $\mathbf{35}_1$, $\mathbf{35}_2$ of audible devices 15. Information from audible devices 15 may be passed by WSN hub 24 to control panel 20 via option bus 22. Control panel 20 may pass information to WSN hub 24 via option bus 22. WSN hub 24 may include a processor 40 and memory 42 for storing software, identification information associated with audible devices 15, and configuration data associated with audible devices 15.

WSN hub 24 may include an antenna element 34 for transmitting and receiving air-borne signals, such as radio frequency signals. The radio frequency signals may be received by and transmitted from, i.e., exchanged with, wireless devices 16. Information from wireless devices 16 may be passed by WSN hub 24 to control panel 20 via option bus 22. Control panel 20 may pass information to WSN hub 24 via option bus 22 for transmission to wireless devices 16 as necessary. WSN hub 24 may include a processor 40 and memory 42 for storing software, identification information associated with wireless devices 16, and configuration data associated with wireless devices 16.

Installer interface 18 may include an outside communication device 44, such as a cell phone, standard phone, or computer equipped with a modem; a house phone 46, which may be hard-wired to telephone interface 30 via a telephone line 48; and a manual interface 50, which may be in the form of a keypad or keyboard. Manual interface 50 may be in communication with WSN hub 24 via option bus 22. Thus, installer interface 18 may be in communication with system controller 14 via public telephone network 32, telephone line 48, and/or option bus 22. Installer interfaces including Ethernet or a networked connection are also possible.

Although only two audible devices 15 are shown in FIG. 1, it is to be understood that security system 10 may include any number of audible devices 15. Audible devices 15 may be in the form of any number or combination of smoke detectors, freezer thaw alarms, heavy equipment back-up warning devices, keyfobs including panic buttons, and any other devices that produce an audible alarm signal. Audible device $15_1$ is indicated in FIG. 1 as being disposed inside building 12, and audible device $15_2$ is indicated in FIG. 1 as being disposed outside building 12. However, any number of audible devices 15 may be disposed within building 12, and any number of audible devices 15 may be disposed outside building 12. Types of audible devices that may be permanently or temporarily disposed outside of building 12 during installation may include heavy equipment back-up warning devices and panic devices.

Although only two wireless devices 16 are shown in FIG. 1, it is to be understood that security system 10 may include any number of wireless devices 16. Wireless devices 16 may be in the form of any number or combination of window sensors, door sensors, glass break sensors, inertia sensors, motion detectors, smoke detectors, panic devices, gas detectors and keyfobs, for example. Window sensors and door sensors may detect the opening and/or closing of a corresponding window or door, respectively. Panic devices may be in the form of devices that human users keep on their person, and that are to be used to summon help in an emergency situation. Gas detectors may sense the presence of a harmful gas such as carbon monoxide, or carbon dioxide. A keyfob may be used to arm or disarm security system 10, and is another device that a user may possibly keep on his person. Each wireless device 16 includes a respective antenna element 52 for transmitting and receiving air-borne signals, such as radio frequency signals. The radio frequency signals may be received by and transmitted from, i.e., exchanged with, WSN hub 24. Wireless devices $16_1$ and $16_2$ are indicated in FIG. 1 as being disposed inside building 12. However, any number of wireless devices 16 may be disposed within building 12, and any number of wireless devices 16 may be disposed outside building 12. Types of wireless devices that may be permanently or temporarily disposed outside of building 12 during installation may include motion detectors, panic devices and keyfobs.

During installation, some types of audible devices 15 may be mounted or hung in a permanent or semi-permanent desired location. Examples of such types of audible devices 15 may include smoke detectors and freezer thaw alarms. Other types of audible devices 15 may be disposed in temporary locations during installation, or may even be in motion, such as a heavy equipment back-up warning device or a panic device or keyfob being carried on a user's person.

During installation, some types of wireless devices 16 may also be mounted or hung in a permanent or semi-permanent desired location. Examples of such types of wireless devices 16 may include window sensors, door sensors, glass break sensors, inertia sensors, motion detectors, smoke detectors, and gas detectors. Other types of wireless devices 16 may be disposed in temporary locations during installation, or may even be in motion, such as a panic device or keyfob being carried on a user's person.

During installation, the audible security devices 15 may be learned after a discover mode has been entered by actuating certain keys on control panel 20. In the discover mode, hub 24 may be instructed to "discover" audible devices 15 and wireless devices 16 that need to be installed in system 10. Discovering an audible device may include actuating a test button on the audible device in order to cause the audible device to emit its audible alarm signal. Hub 24 may then use its sound detector 33 to determine audio characteristics of the alarm signal, such as its frequency profile and loudness, for example. The installer may use manual interface 50 to enter identifying information about the audible device that emits the alarm signal, such as the type of audible device, an identification number, and/or a location of the audible device. The audible device's identifying information may then be stored in memory 28 in association with the audible device's audio characteristics.

Discovering a wireless device 16 may involve two-way communication between hub 24 and the wireless device. More particularly, discovering a wireless device 16 may include receiving, assigning, or otherwise ascertaining unique identification information and configuration data for that device, such as an identification number, a type of the device, time periods when the device is on and off, supervision intervals (i.e., how often the device should report its status), operational parameters based upon the regulations in which the system is to operate, and/or a function of the device.

In a learn mode of operation, system controller 14 issues an air-borne signal requesting that each wireless device 16 that receives the request reply with an identification number and the type of the device. System controller 14 may store each identification number and its associated type in memory 28 for further reference. The identification number may be any string of alphanumeric characters and/or bits that uniquely identifies the wireless device with which the identification information is associated. This identification number may be included within any signal transmitted from a wireless device, both during installation and during surveillance operation of system 10, in order to identify which of wireless devices 16 that the signal is being transmitted from.

The device type information may specify whether the wireless device is a window sensor, door sensor, glass break sensor, inertia sensor, motion detector, smoke detector, gas detector, panic device or keyfob, for example. The device type information may further break down these categories by subcategories such as indoor or outdoor motion detector, garage door or front door sensor, carbon monoxide or carbon dioxide, etc.

Upon receiving the unique identifier of a device 15, 16, system controller 14 may look up the device's type, which may be stored in memory 28 or may be accessed on-line via the internet. Based on the device type, system controller 14 may make some assumptions about how the device should be configured, as discussed above. System controller 14 then may monitor the device dependent upon the type of the device. As used herein, the term "monitoring" may include supervising the security devices, such as by sending instruction signals to the security devices. The term "monitoring" may also include processing reporting signals from the security devices and deciding what action should be taken in response to the reporting signals. For example, system controller 14 may cause an alarm to issue depending upon both a reported change of status of the security device, and how the device has been configured.

Control panel 20 may include a camera 56 which may be used to scan and/or capture an image of a two- or three-dimensional barcode or QR code displayed on a possession 58 of a user in order to determine whether the user is an authorized user of security system 10. Possession 58 may be a badge, cell phone or smartphone belonging to the user, for example. In the particular embodiment shown in FIG. 1, possession 58 is a cell phone or smartphone having a display screen 62 on which the two- or three-dimensional barcode or QR code may be displayed.

Control panel 20 may include a biometric sensor 60 that may sense or measure a biometric characteristic of a user, such as a fingerprint, for example. In another embodiment, sensor 60 is a retina scanner. Biometric sensor 60, in sensing a biometric characteristic of a user, and camera 56, in reading a visual code on user's possession 58, may work in conjunction with each other to verify the identity of the user as being that of an authorized user. Alternatively, camera 56 may both read a visual code on user's possession 58 and sense a biometric characteristic of a user, such as via facial recognition or retina scanning, for example.

In the learn mode of operation, camera 56 may capture images of the authorized users. Using facial recognition software, processor 26 may then later discern whether someone standing in front of control panel 20 and trying to disarm security system 10 is an authorized user who is allowed to disarm the system. For example, when system 10 is armed, and a door sensor 16 senses that an outer door has been opened, system 10 may allow some period of time, such as sixty seconds, for the person walking through the door to enter a security code into the keypad on the control panel and thereby prevent an alarm signal from being transmitted to authorities at CSR 31. However, in another embodiment, camera 56 and the facial recognition software may eliminate, or supplement, the need to enter the security code. That is, if system 10 recognizes the image captured by camera 56 as being the face of an authorized user, then system 10 may be automatically disarmed without the need for the user to enter a security code.

In another embodiment, instead of learning and recognizing the faces of authorized users, gesture recognition software running on processor 26 is used to determine whether the user has performed a hand gesture or gestures that may be used as a password to disarm system 10. That is, processor 26 may recognize movement patterns of the user's hand(s) rather than the user's face. For example, the gesture recognition software and camera may determine whether the user has made one or more hand gestures, such as holding up a certain number of fingers and/or moving the tip of his finger in a vertically-oriented circle, for example. If such a pre-programmed and pre-determined hand gesture, or series of hand gestures, is recognized, then security system 10 may be disarmed. In another embodiment, for additional security, system 10 uses both facial recognition and gesture recognition to require that both the user's face and hand gestures be recognized in order to disarm the system.

In one embodiment, system 10 produces intermittent audible beeps after sensing a security breach such as a door opening in order to warn the user that he must either enter the security code or present his face to camera 56 for identification. Once the user's face has been recognized, system 10 may be disarmed and the beeping may stop (or a green light may come on, etc.) in order to inform the user that there is no longer any need for him to enter the security code. If the user's face cannot be recognized, then entering the security code may be sufficient to disarm the security system. In another embodiment, however, both the security code must be entered and the user's face must be recognized in order to disarm the security system.

Upon the completion of learning and/or testing, system 10 may enter an operational mode in which system 10 performs its intended function of providing surveillance. In the operational mode, wireless devices 16 continue to report their statuses according to and dependent upon their configurations, and system controller 14 continues to monitor devices 15, 16 according to and dependent upon the configurations of devices 15, 16.

Each audible device 15 and wireless device 16 may be provided with an LED 54 that may light up or flash to indicate to the installer that the device is transmitting, or has recently transmitted, some type of signal. If the LED does not light up or flash at the desired device, then the installer may need to perform some troubleshooting. For example, the installer may check the battery (not shown) of the device or replace the device with another one.

There may be an occasion when the default configuration that control system 14 has assigned to a device 15, 16 needs to be changed to suit a particular application. In order to modify the configuration of a device, a user may access manual interface 50 and key in replacement configuration data for the device.

During use, one of audible devices $\mathbf{15}_1$, $\mathbf{15}_2$ may sense an alarm condition and respond thereto by emitting an audible alarm signal. Sound detector 33 receives and detects the audible alarm and processor 26 recognizes the sound as an alarm signal by virtue of its sound characteristics, such as frequency profile and/or loudness. In one embodiment, processor 26 may determine which of audible devices $\mathbf{15}_1$, $\mathbf{15}_2$ has emitted the audible alarm signal by analyzing the sound's identifying characteristics. If, for example, processor 26 determines that an audible device in the form of a smoke detector is emitting the sound, then this identification may be forwarded to CSR 31 such that the proper authorities, e.g., the local fire department, may be notified to respond to the alarm.

In one embodiment, sound detector 33 is in the form of a microphone that may be used to identify an authorized user of security system 10. In the learn mode of operation, the microphone may record the speaking voices of the authorized users. Using voice recognition software running on processor 26, system 10 may then later discern whether someone speaking in front of control panel 20 and trying to disarm security system 10 is an authorized user who is allowed to disarm the system. For example, when system 10 is armed, and a door sensor 16 senses that an outer door has been opened, system 10 may allow some period of time, such as sixty seconds, for the person walking through the door to enter a security code into the keypad on the control panel and thereby prevent an alarm signal from being transmitted to authorities at CSR 31. However, in another embodiment, the microphone and the voice recognition software may eliminate, or supplement, the need to enter the security code. That is, if system 10 recognizes the voice captured by the microphone as being the voice of an authorized user, then system 10 may be automatically disarmed without the need for the user to enter a security code.

In another embodiment, instead of learning and recognizing the voices of authorized users, speech recognition software running on processor 26 is used to determine whether the user has spoken a security code or password(s) that may be used to disarm system 10. That is, processor 26 may recognize the content of the user's speech rather than the user's voice characteristics. For example, the processor's speech recognition software and microphone may determine whether the user has spoken a code phrase, such as "Mary had a little lamb," and, if so, security system 10 may be disarmed. In another embodiment, for additional security, system 10 uses both voice recognition and speech recognition to require that both the user's voice be recognized and the user speak a code word or phrase in order to disarm the system.

In one embodiment, system 10 produces intermittent audible beeps after sensing a security breach such as a door opening in order to warn the user that he must either enter the security code, speak so that his voice can be recognized, or speak the passcode in the vicinity of the microphone. Once the user's voice or spoken passcode has been recognized, system 10 may be disarmed and the beeping may stop (or a green light may come on, etc.) in order to inform the user that there is no longer any need for him to enter the security code. If the user's voice and/or passcode cannot be recognized, then entering the security code may be sufficient to disarm the security system. In another embodiment, however, both the security code must be entered and the user's voice and/or spoken passcode must be recognized in order to disarm the security system.

It is to be understood that it is within the scope of the invention for any combination of the above-described virtual passwords be required to disarm the security system. That is, system 10 may require any combination of facial recognition, gesture recognition, voice recognition, spoken passcode recognition, and/or a keyed-in passcode in order for system 10 to be disarmed.

Control panel 20 may include a display screen 64, which may be in the form of an LCD display, for example. During installation or during a repair process or service call, display screen 64 may display a two- or three-dimensional code or QR code that conveys the status and/or failure modes of security system 10. A cell phone or smartphone 58 belonging to a user, installer, or repairman of system 10 may include a camera or scanning device 66 which may scan and/or capture an image of the code that is displayed on display screen 64. Phone 58 may run an application that interprets or decodes the code displayed on display screen 64. Alternatively, phone 58 may digitally transmit the captured code to an on-line service that provides phone 58 with an interpretation of the code displayed on display screen 64. Having obtained the interpretation of the code, phone 58 may display the interpretation in alphanumeric text form on its display screen 62 for the user, installer or repairman to see. Alternatively, or in addition, phone 58 may convert the interpretation to synthesized speech that may be rendered on the audio speaker (not shown) of phone 58.

Control panel 20 may include several built-in features, functions and/or applications that may be taken advantage of according to the invention. More particularly, as discussed above, the control panel may include a camera 56 and microphone 33 that may enable a user to have a video and audio chat with the security office (e.g., CSR 31). For example, if an alarm signal has been falsely transmitted to CSR 31, such as if the user fails to enter a passcode after returning home, then the user may have a video/audio conference with personnel at CSR 31 in order to convince the personnel that there has been no break-in, and that there is no need to dispatch police to the building. In order to better enable the personnel to identify the person on the video/audio chat as an authorized user, camera 56 may capture images of all authorized users during installation, and these images may be transmitted to, and logged at, CSR 31 so that the personnel may refer to the logged images and verify the identity of the authorized user in real time during the video chat. Similarly, voice samples of authorized users may be recorded during installation and transmitted to, and logged at, CSR 31 so that the personnel may refer to the logged audio recordings during the video/audio chat.

Camera 56 may also enable a user to leave a video message for another authorized user of the security system. A problem with leaving any type of conventional message for a housemate is that it is difficult to ensure that the message is received. That is, if a message is written on paper, it may not be seen by the recipient, or may be seen by another unintended party. Even a voice message on the user's personal electronic device may not be received if the recipient does not check his device. According to the invention, however, a user may use camera 56 and microphone 33 to record a video/audio message for a housemate. For example, manual interface 50 may include a button labeled "message" that the user may touch or push to immediately thereafter record the message (e.g., "please feed the dog"). Optionally, after the message has been recorded, the user may then enter a personal passcode of the intended recipient. The user may then arm the security system and leave the premises. When the housemate enters the house and enters his passcode (which is the one action by the housemate that is almost certain), the recorded message is played back in video and audio for the housemate. If the recording user entered the intended recipient's passcode, then the message is played back only if the housemate's passcode that he keyed in matches the intended recipient's passcode as entered by the recording user.

The user may also use this message feature to leave a reminder message for himself when he returns, perhaps specifying his own passcode. For example, the user may want to remind himself to "take out the trash" when he arrives home.

Camera 56 may also be used to read a printed passcode carried by the user. For example, the user may carry an identification card with a bar code or QR code that camera 56 may scan or capture an image of Alternatively, the user's cell phone or smartphone 58 may display such a bar code or QR code that camera 56 may scan or capture an image of Processor 26 may then compare the code to a list of approved codes in order to verify that the person is an authorized user.

As mentioned above, display screen 64 may be used to display QR codes for diagnostic or status updates. For example, a security system installer or repairman may scan the displayed QR code to ascertain the status or failure mode of system 10. Alternatively, the user may use his personal electronic device to scan or photograph the QR code displayed on the tablet computer, and then the user may electronically transmit the scanned or photographed information to security system repairmen who are located remotely.

Figure 2:
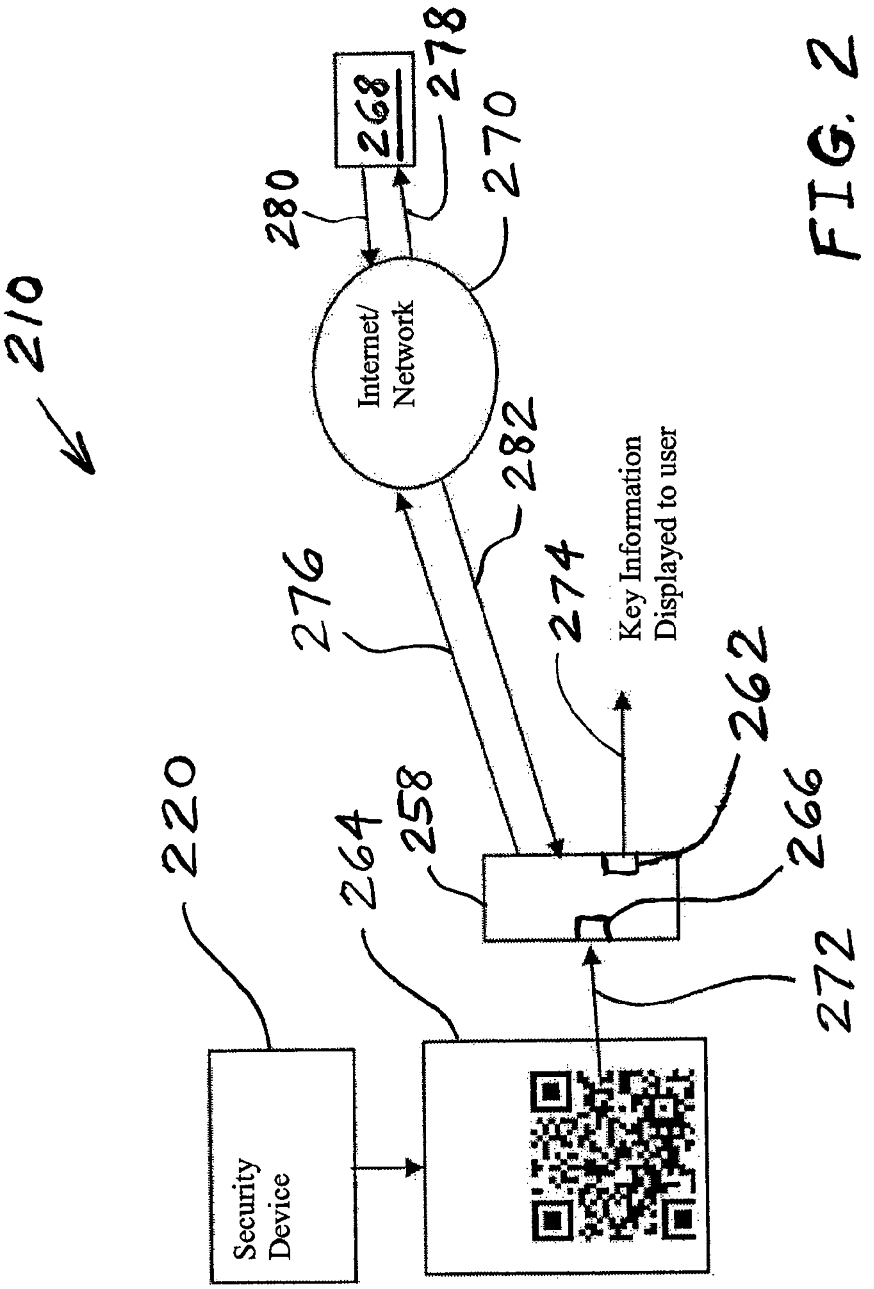
FIG. 2 is a block diagram of another embodiment of a building security arrangement of the invention.

Illustrated in FIG. 2 is a block diagram of another embodiment of a building security arrangement 210 of the invention including an electronic device 220 which has some status or diagnostic information that the user wants to know. In the specific embodiment shown in FIG. 2, however, device 220 is in the form of a security device or building security system. Device 220 may transmit the status or diagnostic information in the form of an electronic and/or digital two- or three-dimensional code or QR code to a display device 264 which is capable of displaying the code. Display device 264 may be separate from security device 220, or may be attached to or part of security device 220. Arrangement 210 also includes a scanning device, which in the embodiment of FIG. 2 may be in the form of a cell phone or smartphone 258 having a camera 266. The code scanned by camera 266 may be interpreted or decoded by an application running on phone 258. Alternatively, phone 258 may transmit the digital code to an on-line server 268 which phone 258 may access through the Internet or other network 270. As another alternative, an application on phone 258 may interpret the digital code, but server 268 may provide additional features or information. For example, upon being informed of the code being displayed on display device 264, server 268 may transmit to phone 258 some recommended actions for the user to take in response to the status information or diagnostic information provided by security device. For example, the status or diagnostic information encoded in the displayed code may indicate that a particular security sensor is malfunctioning, and may indicate what the failure mode of the sensor is. An application running on phone 258 may convey this basic decoded information to the user on a display screen 262 of phone 258. In addition, server 268 may receive the status or diagnostic information from phone 258 and, in response, may transmit a suggested course of action to phone 258, such as "change the battery of the smoke detector," or "clean the lens of the motion detector in the living room," or call a repairman at 317-555-1212 to service the door sensor on the side door," for example. In another embodiment, server 268 may automatically dispatch the appropriate service personnel to the site of the security device and may inform of them of the status, failure mode or diagnostic information associated with the security system.

In one embodiment of a method of the invention for operating arrangement 210, The security device 220 having important information generates and displays on display device 264, as indicated at 272, a QR code which is representative of the data that security device 220 wants to communicate. The QR code may have the data embedded in it, or may be a key figure associated with a look up of common status/diagnostic information. In one embodiment, the QR code is displayed on a graphical keypad of a security system.

In a next step, camera 266 of phone 258 captures the image of the displayed code. Next, an application running on phone 258 may determine the meaning of the displayed code and provide a clear interpretation to the user, as indicated at 274. The interpretation may be determined within phone 258 on the application, or phone 258 may, as indicated at 276, consult some source on the Internet 270, or central server 268, as indicated at 278, to get up-to-date information, updates, literature, and/or troubleshooting information as indicated at 280 and 282. Some or all of the information received via the Internet 270 may be displayed to the user, as indicated at 274.

In one embodiment, the status or diagnostic information may be logged locally or remotely to provide more data for future evaluations. That is, the status or diagnostic information may be stored in memory in security device 220, in phone 258, or in server 268. If security device 220, phone 258 or server 268 determines that a same component has repeatedly failed, then it may also be determined that another component should be repaired or replaced in order to correct the underlying problem. For example, if it is determined that a certain sensor consistently needs to have its battery replaced sooner than normal because of low battery voltage, then it may also be determined that there is something wrong with the sensor that causes the sensor to prematurely drain its battery. Thus, the user may be informed via text displayed at 274 that the particular sensor is consuming too much battery power and should be repaired or replaced.

Figure 3:
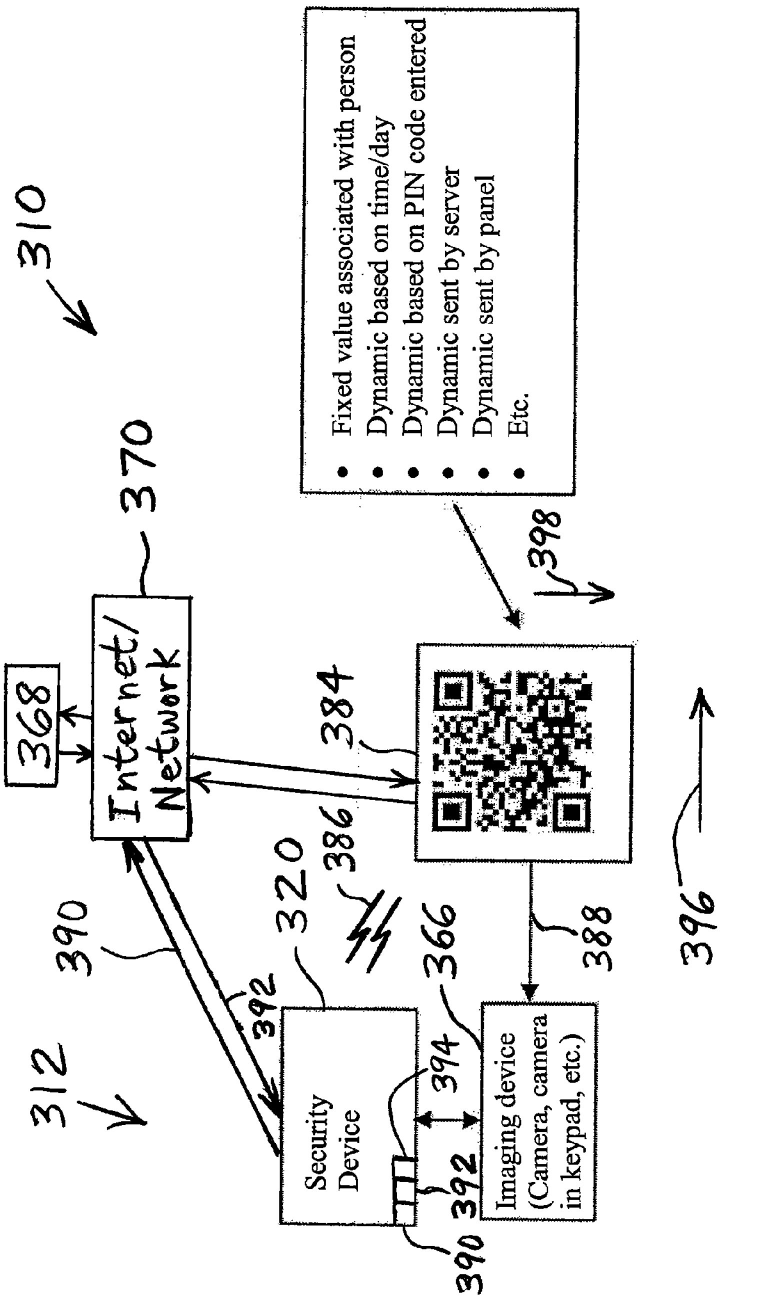
FIG. 3 is a block diagram of yet another embodiment of a building security arrangement of the invention.

Illustrated in FIG. 3 is a block diagram of another embodiment of a building security arrangement 310 of the invention including a security system 312. Security system 312 includes a security device 320 and a camera or other imaging or scanning device 366. Camera device 366 may be separate from security device 320, or may be attached to or part of security device 320.

A user of security system 312 may carry a possession or display device 384 that is capable of displaying a two- or three-dimensional code or QR code. In one embodiment, device 384 may be a smartphone, cell phone or a badge carried by the user. Display device 384 may display a coded fixed value associated with the user, such as an employee identification number.

Alternatively, the coded displayed information by be dynamic, e.g., may change with time, and may be different on each occurrence on which the information is displayed. Such dynamic coded displayed information may be generated by an application running on display device 384. For example, the coded displayed information may change based on the time-of-day, or day of the week. The coded information displayed on display device 384 may depend upon a personal identification number (PIN) code entered by the user into a personal electronic device serving as display device 384.

As another alternative, the coded information displayed on display device 384 may be dynamic and may be transmitted to display device 384 by a server 368 via Internet or other network 370. The coded information displayed on display device 384 may also be transmitted to security device 320 by server 368 via Internet or other network 370 so that security device 320 may know what coded information to expect to see displayed on display device 384.

As yet another alternative, the coded information displayed on display device 384 may be dynamic and may be wirelessly transmitted to display device 384 by security device 320, as indicated at 386. Thus, by telling display device 384 what coded information to display, security device 320 may know what coded information to expect to see displayed on display device 384. That is, security device 320 may wirelessly transmit a code to a personal electronic device of the human user including display device 384, and provide the human user with access to the building only if the deciphered scanned code corresponds to the code wirelessly transmitted to the personal electronic device by security device 320.

The code scanned by camera device 366 may be interpreted or decoded by an application or software running on security device 320. Alternatively, security device 320 may transmit the digital code to an on-line server 368 which security device 320 may access through the Internet or other network 370. As another alternative, an application on security device 320 may interpret the digital code, but server 368 may provide additional features or information. For example, upon being informed of the code being displayed on display device 384, server 368 may transmit to security device 320 some up-to-the-minute information about the validity of the coded displayed information or about the status or authorization of the person who carries display device 384. For example, server 368 may transmit to security device 320 a list of other secured locations at which the user has recently gained access, and whether the person is an authorized employee at the particular moment in time.

In one embodiment of a method of the invention for operating arrangement 310, a user carrying display device 384 approaches camera device 366 of security system 312. Display device 384, as indicated at 388, displays a QR code which is representative of the authorization level or allowed access level of the person carrying display device 384.

In a next step, camera device 366 is prompted to capture the image of the code that is being displayed on display device

384 and that is being held up by the user in front of camera device 366. Camera device 366 may be prompted to capture the image by the user providing input to a keypad 390 of security device 320; by a motion detector 392 detecting motion in front of camera device 366; or by a door sensor 394 sensing that a door (not shown) that is near camera device 366 has been opened or closed in the preceding sixty seconds or so. Motion detector 392 may be an infrared motion detector, for example. It is also possible for camera device 366 to function as a motion detector. That is, camera device 366 may sense human motion whenever the image it captures changes. After such human detection, camera device 366 may switch to a scanning mode in which it specifically scans for a particular type of code. Camera device 366 and security device 320 could alternatively begin processing the captured images to detect a code therein after camera device 366 has detected human motion.

In another embodiment, however, camera device 366 continuously scans for the coded image displayed by display device 384. That is, camera device 366 may automatically capture new images at approximate one second intervals.

Next, the user displays his authorization code to camera device 366. The user may take some positive action to cause the code to be displayed, such as by entering input into his smartphone to thereby cause display device 384 on his smartphone to display the appropriate code. The user may hold up display device 384 to face camera device 366 while display device 384 displays the code. The user could also hold up his badge to face camera device 366.

Alternatively, the user may display the code on display device 384 without having to take any positive action, and may not even realize that camera device 366 is capturing an image of display device 384. For example, camera device 366 may be capable of reading or scanning a user's badge while the badge hangs from his neck or while the badge is pinned to his clothes without the user having to hold the badge up to face display device 384.

Finally, an application or software running on security device 320 may determine whether the displayed code on display device 384 represents an authorized user who should be allowed access to the premises. The determination or validation of the scanned code may be performed within security device 320 by the software, or security device 320 may, as indicated at 390, consult some source on the Internet 370, or central server 368, as indicated at 392, to determine whether the user who displays the particular code should be granted access to the premises.

Figure 4:
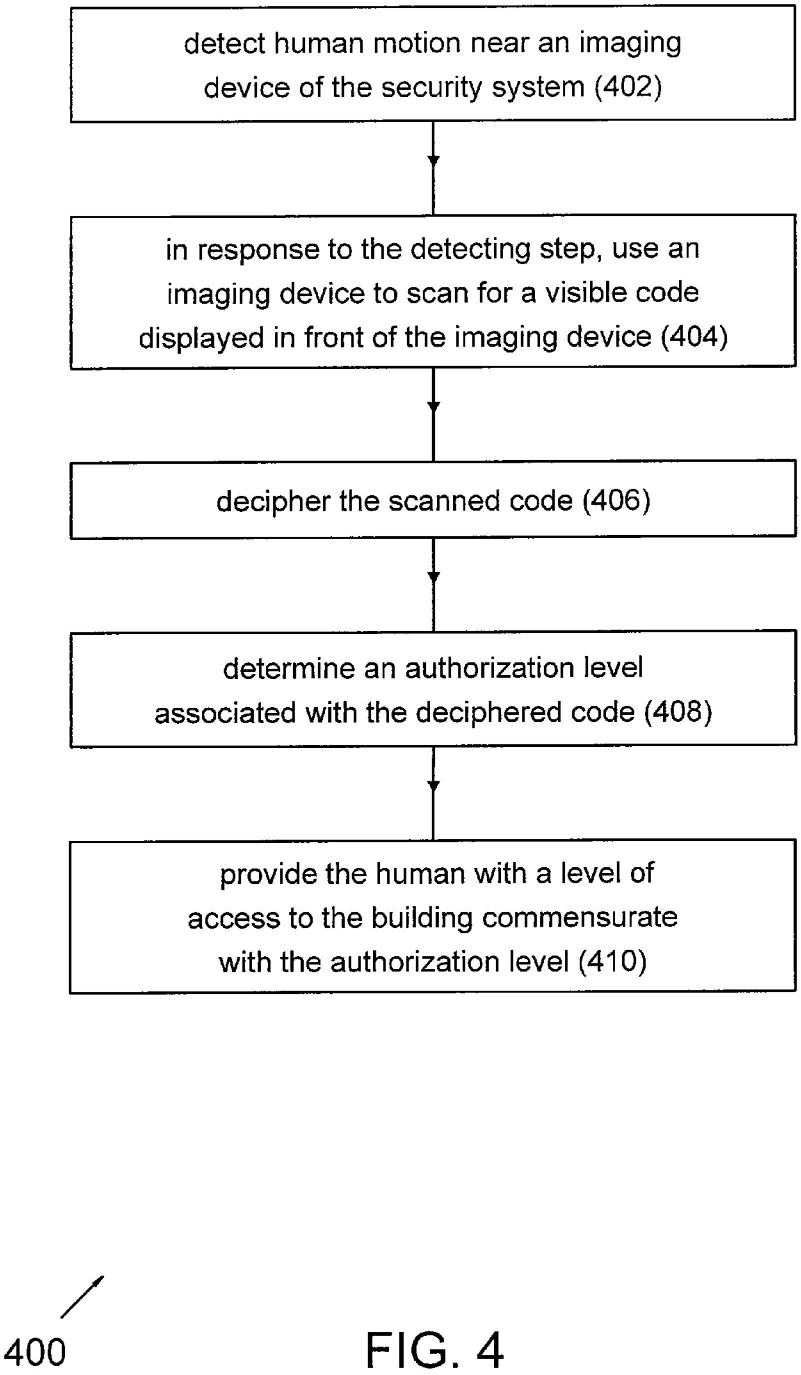
FIG. 4 is a flow chart of a method of the present invention for operating a building security system.

One embodiment of a method 400 of the present invention for operating a building security system is shown in FIG. 4. In a first step 402, human motion is detected near an imaging device of the security system. For example, in the embodiment of FIG. 3, a motion detector 392 detects human motion in front of camera device 366. Alternatively, camera device 366 may sense human motion in front of camera device 366. In one embodiment, the motion detector 392 detects human motion in a space within six feet of camera device 366.

Next, in step 404, in response to the detecting step 400, an imaging device is used to scan for a visible code displayed in front of the imaging device. In the embodiment of FIG. 3, camera device 366 may scan in both a horizontal direction 396 and a vertical direction 398 for a two-dimension code such as the QR code shown in FIG. 3. More generally, camera device 366 may scan in each of two directions that are perpendicular to each other. The QR code may be displayed on an electronic device carried by the user, such as a smartphone. Alternatively, the QR code may be displayed on a static device, such as a badge pinned to the clothes of the user, or hanging from the user's neck.

In step 406, the scanned code is deciphered. That is, software may run on security device 320 that deciphers the digital QR code scanned by camera device 366.

In a next step 408, an authorization level associated with the deciphered code is determined. The software running on security device 320 may have a lookup table, for example, that indicates an authorization level associated with the deciphered code. One deciphered code may connote that the user should have a first authorization level providing full access to any room in the building. Another deciphered code may connote that the user should have a second authorization level providing access to only the garage of the building, such as if the user is a yard worker or a maintenance man. In one embodiment, security device 320 may consult some online source, such as server 368, through Internet 370 in order to determine an authorization level associated with the deciphered code.

In a final step 410, the human is provided with a level of access to the building commensurate with the authorization level. For example, if the user has the first authorization level providing full access to any room in the building, then no alarm is sounded, electronically or audibly, regardless of where in the building the user may go. However, if the user has the second authorization level providing access to only the garage, then an alarm may be sounded, electronically or audibly, if the user is sensed in any area of the building other than the garage. That is, if a kitchen door sensor detects the kitchen door opening by a person with the first authorization level, then no alarm signal is transmitted. However, if a kitchen door sensor detects the kitchen door opening by a person with the second authorization level, then an alarm signal may be transmitted. Thus, a response of the security device to a security sensor signal may be dependent upon the determined authorization level.

The present invention has been described herein as being used in conjunction with a two-dimensional code such as a QR code. However, it is to be understood that the invention is equally applicable to three-dimensional bar codes in which information may be represented by the height of each line in the code.

While this invention has been described as having an exemplary design, the invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A building security system comprising:

means for detecting human motion;

an imaging device configured to scan for a visible code in response to the detection of human motion by the detecting means; and a security device configured to:

decipher the scanned code;

determine an authorization level associated with the deciphered code; and provide the human with a level of access to the building commensurate with the authorization level, wherein the security device is further configured to:

wirelessly transmit a code to a personal electronic device of the human; and provide the human with access to the building only if the deciphered scanned code corresponds to the wirelessly transmitted code.

2. The system of claim 1 wherein the detecting means comprises an infrared motion detector.

3. The system of claim 1 wherein the imaging device comprises a camera configured to scan for the visible code in each of two perpendicular directions.

4. The system of claim 1 wherein the imaging device configured to scan for a visible code in response to the detection of human motion in a space within six feet of the imaging device.

5. The system of claim 1 wherein the visible code comprises a QR code.

6. The system of claim 1, wherein a response of the security device to a security sensor signal is dependent upon the determined authorization level.

7. The building security system of claim 1, wherein the imaging device is configured to scan for a visible code on a device worn by a moving human.

8. A method of operating a building security system, comprising the steps of:

detecting human motion near an imaging device of the security system;

in response to the detecting step, using an imaging device to scan for a visible code displayed in front of the imaging device;

deciphering the scanned code;

determining an authorization level associated with the deciphered code; and providing the human with a level of access to the building commensurate with the authorization level, and comprising the further steps of:

using the security device to wirelessly transmit a code to a personal electronic device of the human; and using the security device to provide the human with access to the building only if the deciphered scanned code corresponds to the wirelessly transmitted code.

9. The method of claim 8 wherein the detecting step is performed by an infrared motion detector.

10. The method of claim 8 wherein the imaging device comprises a camera, the using step comprising using the camera to scan for the visible code in each of two perpendicular directions.

11. The method of claim 8 wherein the using step comprises using the imaging device to scan for a visible code in response to the detecting of human motion in a space within six feet of the imaging device.

12. The method of claim 8 wherein the visible code comprises a QR code.

13. The method of claim 8, comprising the further step of using the security device to respond to a security sensor signal dependent upon the determined authorization level.

14. The method of claim 8, further comprising:

determining at least one room where the human is not permitted based on the authorization level; and activating an alarm when the human is detected in the at least one room where the human is not permitted.

15. The method of claim 14, further comprising determining at least one room where the human is permitted based on the authorization level, and wherein the act of providing the human with a level of access to the building commensurate with the authorization level includes not activating the alarm when the human is detected in the at least one room where the human is permitted.

16. A building security system comprising:

a motion detector;

an imaging device configured to scan for a visible code on a personal electronic device carried by a human in response to detection of motion by the motion detector; and a controller configured to:

wirelessly transmit a code to a personal electronic device of the human, decipher a code displayed on the personal electronic device of the human using the imaging device, determine an authorization level of access to the building based on the deciphered code, and providing the human with the determined level of access to the building only if the deciphered code matches the wirelessly transmitted code.

17. The building security system of claim 16, wherein the controller is further configured to determine at least one room where the human is not permitted based on the authorization level, and activate an alarm when the human is detected in the at least one room where the human is not permitted.

18. The building security system of claim 17, wherein the controller is further configured to determine at least one room where the human is permitted based on the authorization level, and wherein the security device is configured to provide the human with the level of access to the building commensurate with the authorization level by not activating the alarm when the human is detected in the at least one room where the human is permitted.

* * * * *